United States Patent
Tran et al.

(10) Patent No.: US 11,368,756 B1
(45) Date of Patent: Jun. 21, 2022

(54) SYSTEM AND METHOD FOR CORRELATING VIDEO FRAMES IN A COMPUTING ENVIRONMENT

(71) Applicant: Retrocausal, Inc., Sammamish, WA (US)

(72) Inventors: Quoc-Huy Tran, Redmond, WA (US); Muhammad Zeeshan Zia, Sammamish, WA (US); Andrey Konin, Redmond, WA (US); Sanjay Haresh, Karachi (PK); Sateesh Kumar, Karachi (PK); Shahram Najam Syed, Karachi (PK)

(73) Assignee: Retrocausal, Inc.

( * ) Notice: Subject to any disclaimer, the term of this patent is extended or adjusted under 35 U.S.C. 154(b) by 0 days.

(21) Appl. No.: 17/213,306

(22) Filed: Mar. 26, 2021

(51) Int. Cl.
| | |
|---|---|
| *H04N 21/466* | (2011.01) |
| *H04N 21/44* | (2011.01) |
| *H04N 21/43* | (2011.01) |
| *H04N 21/442* | (2011.01) |
| *G06K 9/62* | (2022.01) |

(Continued)

(52) U.S. Cl.
CPC ....... *H04N 21/4666* (2013.01); *G06K 9/6215* (2013.01); *G06K 9/6232* (2013.01); *G06K 9/6259* (2013.01); *G06N 3/088* (2013.01); *G06V 20/20* (2022.01); *H04N 21/4305* (2013.01); *H04N 21/44008* (2013.01); *H04N 21/44209* (2013.01)

(58) Field of Classification Search
CPC ........... H04N 21/4666; H04N 21/4305; H04N 21/44008; H04N 21/44209; G06V 20/20; G06K 9/6215; G06K 9/6232; G06K 9/6259; G06N 3/088
See application file for complete search history.

(56) References Cited

U.S. PATENT DOCUMENTS

| | | |
|---|---|---|
| 9,984,728 B2 | 5/2018 | Yalniz et al. |
| 10,923,157 B2 | 2/2021 | Hendry et al. |
| 2017/0264902 A1* | 9/2017 | Ye ........................ H04N 19/154 |

OTHER PUBLICATIONS

Temporal Cycle-Consistency Learning; Debidatta Dwibedi, Yusuf Aytar, Jonathan Tompson, Pierre Sermanet and Andrew Zisserman; arXiv:1904.07846v1 [cs.CV] Apr. 16, 2019.
(Continued)

*Primary Examiner* — Randy A Flynn
(74) *Attorney, Agent, or Firm* — Jason C. Cameron

(57) ABSTRACT

A system and method for correlating video frames in a computing environment. The method includes receiving first video data and second video data from one or more data sources. The method further includes encoding the received first video data and the second video data using machine learning network. Further, the method includes generating first embedding video data and second embedding video data corresponding to the received first video data and the received second video data. Additionally, the method includes determining a contrastive IDM temporal regularization value for the first video data and the second video data. The method further includes determining temporal alignment loss between the first video data and the second video data. Also, the method includes determining correlated video frames between the first video data and the second video databased on the determined temporal alignment loss and the determined contrastive IDM temporal regularization value.

22 Claims, 10 Drawing Sheets

(51) Int. Cl.
   *G06N 3/08* (2006.01)
   *G06V 20/20* (2022.01)

(56) References Cited

OTHER PUBLICATIONS

Time-Contrastive Networks: Self-Supervised Learning from Video; Pierre Sermanet, Corey Lynch, Yevgen Chebotar, Jasmine Hsu, Eric Jang, Stefan Schaal, Sergey Levine; arXiv:1704.06888v3 [cs.CV] Mar. 20, 2018.

Shuffle and Learn: Unsupervised Learning using Temporal Order Verification; Ishan Misra, C. Lawrence Zitnick, Martial Hebert, The Robotics Institute, Carnegie Mellon University, Facebook AI Research; arXiv:1603.08561v2 [cs.CV] Jul. 26, 2016.

Order-preserving Wasserstein Distance for Sequence Matching; Bing Su, Gang Hua, Science & Technology on Integrated Information System Laboratory, Institute of Software, Chinese Academy of Sciences, Beijing 100190, China, Microsoft Research.

Few-Shot Video Classification via Temporal Alignment; Kaidi Cao Jingwei Ji, Zhangjie Cao, Chien-Yi Chang, Juan Carlos Niebles, Stanford University.

D3TW: Discriminative Differentiable Dynamic Time Warping for Weakly Supervised Action Alignment and Segmentation; Chien-Yi Chang, De-An Huang, Yanan Sui, Li Fei-Fei, Juan Carlos Niebles Stanford University, Stanford, CA 94305, USA; arXiv:1901.02598v2 [cs.CV] Apr. 11, 2019.

Soft-DTW: a Differentiable Loss Function for Time-Series; Marco Cuturi, Mathieu Blondel.

* cited by examiner

SYSTEM AND METHOD FOR CORRELATING VIDEO FRAMES IN A COMPUTING ENVIRONMENT

FIELD OF INVENTION

Embodiments of a present disclosure relate to video representations for deep neural networks and more particularly to a system and a method for correlating video frames in a computing environment that facilitate finding corresponding clips across multiple videos.

BACKGROUND

Temporal alignment of videos is often a vital step in several important tasks such as transferring annotations for video data, time and motion studies of manual industrial processes, detecting anomalies such as in the operation of a machine or human performing repetitive action, video retrieval and the like. Existing techniques vary on how to compute the temporal alignments. With the advent of deep neural networks, a few approaches for self-supervised video representation learning have recently been proposed in academic literature. One class of methods learn representations by predicting future frames or forecasting their encoding features. Another group of methods leverage temporal information such as temporal order or temporal coherence. A recent method learns representations via consistency across different viewpoints and neighbouring frames. The above approaches usually optimize over a single video at a time.

There exists literature on time series alignment but only a few ideas are applicable to video data. Unfortunately, traditional methods for time series alignment, e.g., Dynamic Time Warping (DTW), are not mathematically "differentiable" and hence cannot be directly used for training neural networks, which yield superior performance on many video understanding tasks. To address this weakness, a smooth approximation of DTW, namely Soft-DTW, was introduced in the literature. More recently, Soft-DTW formulations have been used in a weakly supervised setting for aligning a video to a transcript or in a few-shot supervised setting for video classification. In a recent approach, self-supervised representations are learnt by finding frame correspondences across videos, however, it aligns each frame independently, leading to leveraging only frame level cues.

Hence, there is a need for an improved system and a method for correlating video frames in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for correlating video frames in a computing environment is disclosed. The system includes one or more hardware processors and a memory coupled to the one or more hardware processors. The memory includes a plurality of subsystems in the form of programmable instructions executable by the one or more hardware processors. The plurality of subsystems includes a receiver subsystem configured for receiving first video data and second video data from one or more data sources. Each of the first video data and the second video data comprises at least one of a video frame or a set of video frames. The plurality of subsystem further includes an encoder subsystem configured for encoding the received first video data and the second video data using one or more machine learning networks. Furthermore, the plurality of subsystem includes an embedding video generator subsystem configured for generating first embedding video data and second embedding video data corresponding to the received first video data and the received second video data. The first embedding video data and the second embedding video data comprises first feature vectors and second feature vectors. Further, the plurality of subsystem includes a regularization value determination subsystem configured for determining a contrastive IDM temporal regularization value for the first video data and the second video data using—distance matrix, margin parameter and window size. Also, the plurality of subsystem includes a temporal alignment loss value determination subsystem configured for determining temporal alignment loss between the first video data and the second video data using soft-minimum cost path in the distance matrix. Also, the plurality of subsystem includes a video frame correlator subsystem configured for determining correlated video frames between the first video data and the second video data based on the determined temporal alignment loss and the determined contrastive IDM temporal regularization value. An embedding function is determined by optimizing the temporal alignment loss and the contrastive IDM temporal regularization value. The correlated video frames between the first video data and the second video data are aligned in time. Additionally, the plurality of subsystem includes a rendering subsystem configured for rendering the determined correlated video frames between the first video data and the second video data on a user interface of a user device.

In accordance with another embodiment of the present disclosure, a method for correlating video frames in a computing environment is disclosed. The method includes receiving first video data and second video data from one or more data sources. Each of the first video data and the second video data comprises at least one of a video frame or a set of video frames. The method further includes encoding the received first video data and the second video data using one or more machine learning networks. Further, the method includes generating first embedding video data and second embedding video data corresponding to the received first video data and the received second video data. The first embedding video data and the second embedding video data comprises first feature vectors and second feature vectors. Additionally, the method includes determining a contrastive IDM temporal regularization value for the first video data and the second video data using distance matrix, margin parameter and window size. The method further includes determining temporal alignment loss between the first video data and the second video data using soft-minimum cost path in the distance matrix. Also, the method includes determining correlated video frames between the first video data and the second video data based on the determined temporal alignment loss and the determined contrastive IDM temporal regularization value. The correlated video frames between the first video data and the second video data are aligned in time. An embedding function is determined by optimizing the temporal alignment loss and the contrastive IDM temporal regularization value. Furthermore, the method includes rendering the determined correlated video frames between the first video data and the second video data on a user interface of a user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
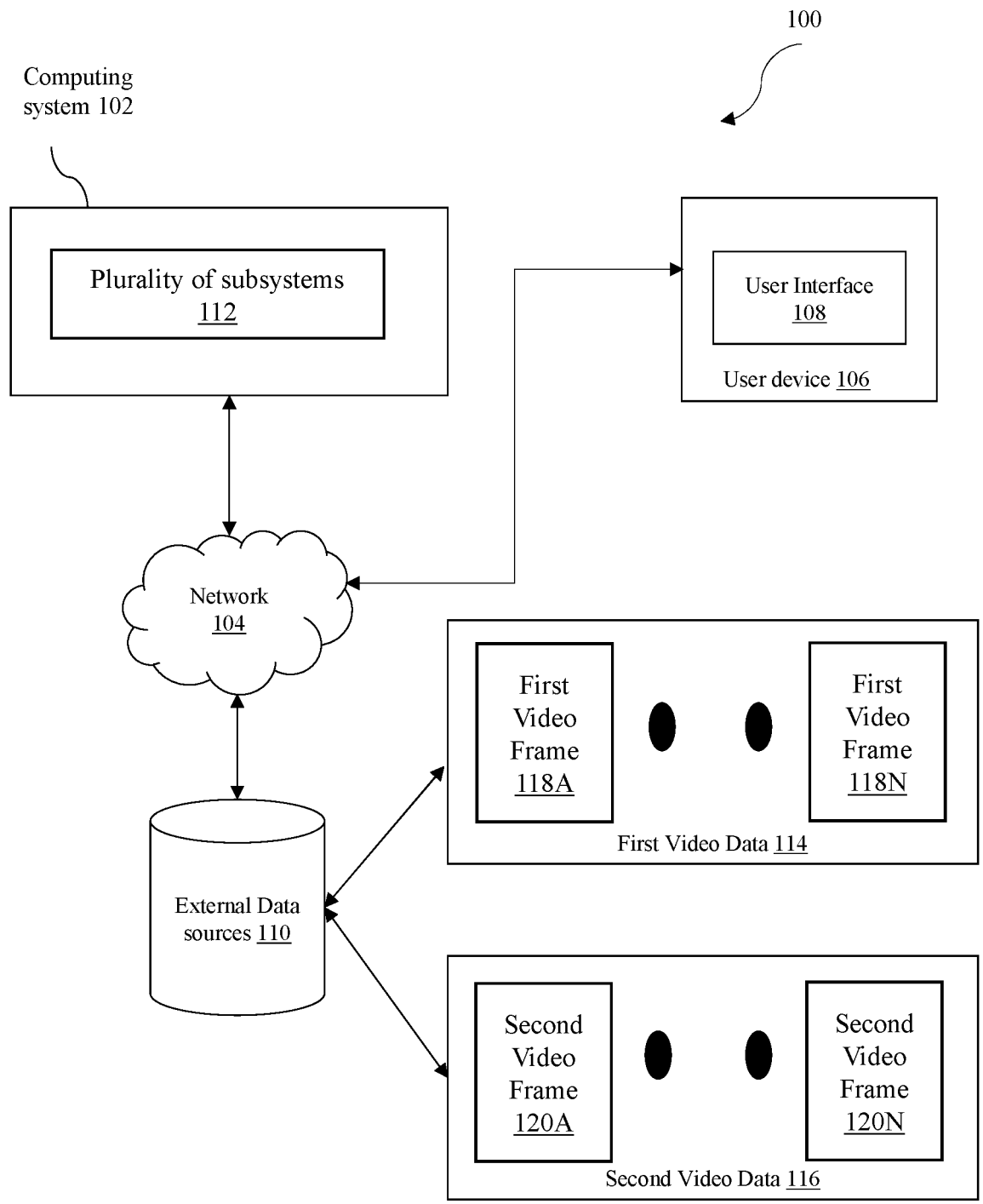
FIG. 1 is a block diagram illustrating an exemplary computing environment for correlating video frames in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Throughout this document, the terms browser and browser application may be used interchangeably to mean the same thing. In some aspects, the terms web application and web app may be used interchangeably to refer to an application, including metadata, that is installed in a browser application. In some aspects, the terms web application and web app may be used interchangeably to refer to a website and/or application to which access is provided over a network (e.g., the Internet) under a specific profile (e.g., a website that provides email service to a user under a specific profile). The terms extension application, web extension, web extension application, extension app and extension may be used interchangeably to refer to a bundle of files that are installed in the browser application to add functionality to the browser application. In some aspects, the term application, when used by itself without modifiers, may be used to refer to, but is not limited to, a web application and/or an extension application that is installed or is to be installed in the browser application.

Embodiments of the present disclosure disclose a system and method for learning self-supervised video representations by temporally aligning videos. The present system leverages a novel combination of temporal video alignment loss and temporal regularization, which are used as supervision signals for training a neural network (namely, encoder) to encode video frames into feature vectors in an embedding space. The resulting embeddings are applied for temporal video alignment, e.g., by simply matching feature vectors using nearest neighbour search. For example, the embedding space is learnt where two videos with similar contents are conveniently aligned in time. Further, the present system first aims at optimizing the embedding space solely for determining temporal alignment cost between the two videos, which can lead to trivial solutions. To overcome this problem, the embedding space is regularized such that for each input video, temporally close frames are mapped to nearby points in the embedding space, whereas temporally distant frames are correspondingly mapped far away in the embedding space. In addition, the learned embeddings are useful for other applications such as annotation transfer in videos, anomaly detection in videos, action phase classification, action phase progression, and fine-grained frame retrieval in videos.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for correlating video frames in accordance with an embodiment of the present disclosure. According to FIG. 1, the computing environment 100 comprises a computing system 102 which is capable of managing video representations of a first video data 114 and a second video data 116 stored in one or more external data sources 110 (also referred herein as 'one or more data sources'). The first video data 114 comprises a first set of video frames 118A-N. Further, the second video data 116 comprises a second set of video frames 120A-N. The computing system 102 is connected to the one or more external data sources 110 via a network 104 (e.g., Internet). The computing system 102 is further connected to a user device 106 via the network 104 (e.g., Internet). In one specific embodiment, the one or more communication networks 104 may include, but not limited to, an internet connection, a wireless fidelity (WI-FI) and the like. Although FIG. 1 illustrates the computing system 102 connected to one user device 106, one skilled in the art can envision that the computing system 102 can be connected to several user devices located at different locations via the network 104.

The user devices 106 can be a laptop computer, a desktop computer, a tablet computer, a smartphone and the like. The user device 106 can access software applications via a web browser. The user device 106 includes a user interface 108 for managing the software applications for learning video representations in a self-supervised manner. The software application may be a web application including one or more web pages.

The computing system 102 includes an interface, a server including hardware assets and an operating system (OS), a network interface, and application program interfaces (APIs). The interface enables communication between the server and the user device 106. As used herein, "computing environment" 100 refers to a processing environment comprising configurable computing physical and logical assets, for example, networks, servers, storage, applications, services, etc., and data distributed over the platform. The computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality. A detailed view of the computing system 102 is provided in FIG. 2.

The computing system 102 comprises a plurality of subsystems 112 configured for learning video representations. In an embodiment, the computing system 102 is configured for receiving the first video data 114 and the second video data 116 from the one or more data sources 110. Each of the first video data 114 and the second video data 116 comprises at least one of a video frame, such as the first video frame 118A or the second video frame 120A or a set of video frames, such as the first set of video frames 118A-N or the second set of video frames 120A-N. Further, the computing system 102 is configured for encoding the received first video data 114 and the second video data 116 using one or more machine learning networks. Furthermore, the computing system 102 is configured for generating first embedding video data and second embedding video data corresponding to the received first video data and the received second video data. The first embedding video data and the second embedding video data comprises first feature vectors and second feature vectors.

The computing system 102 is also configured for determining a contrastive IDM temporal regularization value for the first video data 114 and the second video data 116 using self-distance matrix, margin parameter and window size. Further, the computing system 102 is configured for determining temporal alignment loss between the first video data 114 and the second video data 116 using soft-minimum cost path in the distance matrix. The computing system 102 is also configured for determining correlated video frames between the first video data 114 and the second video data 116 based on the determined temporal alignment loss and the determined contrastive IDM temporal regularization value. The correlated video frames between the first video data 114 and the second video data 116 are aligned in time. An embedding function is determined by optimizing the temporal alignment loss and the contrastive IDM temporal regularization value. Further, the computing system 102 is configured for rendering the determined correlated video frames between the first video data 114 and the second video data 116 on a user interface 108 of the user device 106.

The external data sources 110 are external databases comprising one or more video data. For example, the external data sources 110 is configured to store the first video data 114 and the second video data 116. In an exemplary embodiment, a user of the user device 106 captures a video data of a scene. The captured video data may then be stored on the local storage device of the user device 106 as well as uploaded to the external data sources 110. The external data sources 110 holds a record of such video data. Each of the captured video data comprises one or more video frames. For example, the first video data 114 comprises the first set of video frames 118A-N and the second video data 116 comprises the second set of video frames 120A-N. The first video data 114 and the second video data 116 are then accessed by the computing system 102 via the network 104 for managing the video representations.

In one alternate embodiment, the user device 106 may itself act as a computing system 102 capable of managing the video representation as described herein. In such embodiment, the user device 106 itself comprises the plurality of subsystems. Further, in such embodiment, the user device 106 interacts with the one or more external data sources 110 to access the first video data 114 and the second video data 116.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 102 as is unique to the present disclosure or necessary for an understanding of the present disclosure is depicted and described. The remainder of the construction and operation of the computing system 102 may conform to any of the various current implementation and practices known in the art.

Figure 2:
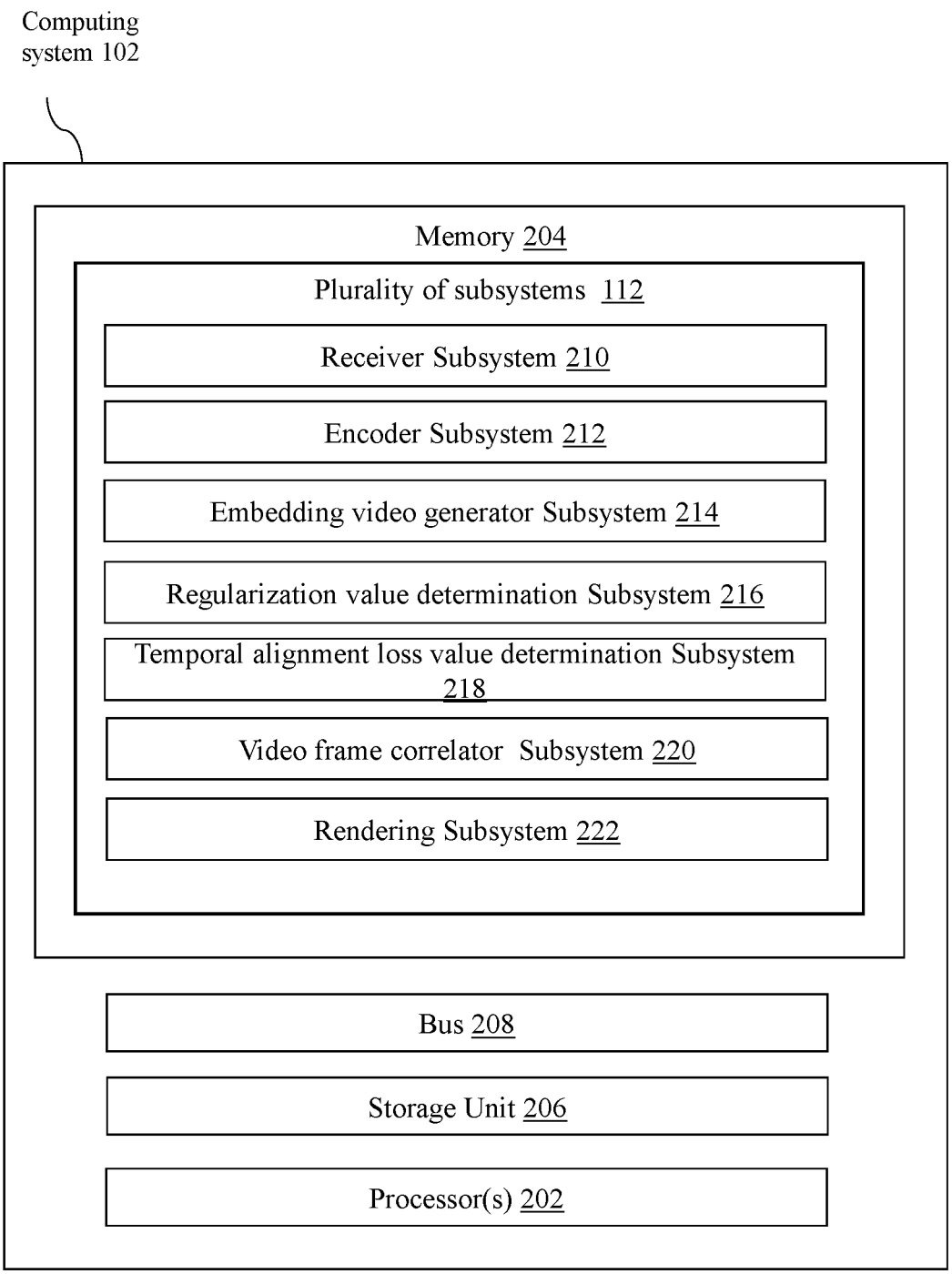
FIG. 2 is a block diagram illustrating an exemplary computing system, such as those shown in FIG. 1, capable of correlating video frames in accordance with an embodiment of the present disclosure.

FIG. 2 is a block diagram illustrating an exemplary computing system 102, such as those shown in FIG. 1, capable of correlating video frames in accordance with an embodiment of the present disclosure. In FIG. 2, the computing system 102 comprises a processor 202, a memory 204, and a database 206. The processor 202, the memory 204 and the database 206 are communicatively coupled through a system bus 208 or any similar mechanism. The memory 204 comprises a plurality of subsystems 112 (such as those shown in FIG. 1) in the form of programmable instructions executable by the one or more processors 202. The plurality of subsystems 112 further includes a receiver subsystem 210, an encoder subsystem 212, embedding video generator subsystem 214, a regularization value determination subsystem 216, a temporal alignment loss value determination subsystem 218, a video frame correlator subsystem 220 and a rendering subsystem 222.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like. The computing system 102 may be a cloud computing system or a remote server.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems 112 stored in the form of machine-readable instructions on any of the above-mentioned storage media and may be in communication with and executed by the processor(s) 202.

The receiver subsystem 210 is configured for receiving the first video data 114 and the second video data 116 from the one or more data sources 110. Each of the first video data 114 and the second video data 116 comprises at least one of a video frame or a set of video frames. The at least one of the video frame may be the first video frame 118A or the second video frame 120A. The set of video frames may be the first set of video frames 118A-N and/or the second set of video frames 120A-N. Each of the video frame or the set of video frames comprises a complete scene or a part of the scene captured. Each of the video frame or the set of video frames are resized to 224×224 before feeding to one or more machine learning networks.

The encoder subsystem 212 is configured for encoding the received first video data 114 and the second video data 116 using the one or more machine learning networks, e.g., deep neural networks. The encoder subsystem 212 is further configured for extracting one or more features associated with each of the first video data 114 and the second video data 116. The extracted features include low-level/geometric features, such as colors, edges, as well as high-level/semantic features, such as, object categories, object poses and the like. Also, the encoder subsystem 212 is further configured for aggregating temporal information, such as, optical flows, object motions, associated with each of the one or more extracted features using three-dimensional (3D) convolution layers.

In an exemplary embodiment, a ResNet 50 encoder is used as a backbone network. The one or more features are extracted from output of a convolution layer, such as Conv4c layer. The one or more extracted features have temporal dimensions of 14×14×1024. Each of the one or more extracted features of the current frame and the context frame are then stacked together along the temporal dimension. Later, the combined one or more features are passed through three-dimensional (3D) convolutional layers for aggregating the temporal information.

The embedding video generator subsystem 214 is configured for generating a first embedding video data and a second embedding video data corresponding to the received first video data 114 and the received second video data 116. The first embedding video data and the second embedding video data comprises first feature vectors and second feature vectors. In generating first embedding video data and second embedding video data corresponding to the received first video data 114 and the received second video data 116, the embedding video generator subsystem 214 is configured for analysing the aggregated temporal information associated with each of the one or more extracted features. Further, the embedding video generator subsystem 214 is configured for learning an artificial neural network encoder model associated with the extracted one or more features based on the analysis. The artificial neural network encoder model comprises first feature vectors associated with the first video data 114 and second feature vectors associated with second video data 116. Further, the embedding video generator subsystem 214 is configured for generating the first embedding video data and the second embedding video data corresponding to the received first video data 114 and the received second video data 116 based on the learned artificial neural network encoder model. The learned artificial neural network encoder model includes the learned network parameters (often called network weights).

In an exemplary embodiment, the extracted one or more features are fed to a global max pooling layer, two fully connected layers, and a linear projection layer to output the first embedding video data and the second embedding video data. Each of the first embedding data and the second embedding video data comprises 128 dimensions.

The regularization value determination subsystem 216 is configured for determining a contrastive inverse different moment (IDM) temporal regularization value for the first video data 114 and the second video data 116 using self-distance matrix, margin parameter and window size. In determining the contrastive IDM temporal regularization value for the first video data 114 and the second video data 116 using self-distance matrix, margin parameter and window size, the regularization value determination subsystem 216 is configured for determining self-distance matrix for the first video data 114 and the second video data 116 using the first embedding video data and the second embedding video data. Further, the regularization value determination subsystem 216 is configured for determining margin parameter and window size for each video frame in the first video data 114 and the second video data 116. The window size indicates temporally far away video frames and temporally close video frames. The regularization value determination subsystem 216 is further configured for determining the contrastive IDM temporal regularization value for the first video data 114 and the second video data 116 using the determined self-distance matrix, the margin parameter and the window size.

In an exemplary embodiment, all the video frames in the first video data 114 and the second video data 116 are mapped to a small cluster in an embedding space. To avoid that, a temporal regularization is added, which is applied separately on the first embedding video data (denoted as fθ(X)) and the second embedding video data (denoted as fθ(Y)). Below, regularization for fθ(X) is provided, which is similarly applicable for fθ(Y). Specifically, a new regularization, referred as Contrastive Inverse Different Moment (IDM) (also referred as Contrastive-IDM for short) is given:

$$I(X)=1/n\Sigma_{i=1,\ldots,n}\Sigma_{j=1,\ldots,n}y_{ij}W(i,j)\max(0,\lambda-D_{X(i,j)})+(1-y_{ij})D_{X(i,j)}/W(i,j),\quad \text{equation (1)}$$

$$W(i,j)=(i-j)^2+1,\quad \text{equation (2)}$$

$$y_{ij}=1 \text{ if } |i-j|>\sigma \text{ or } y_{ij}=0 \text{ if } |i-j|\leq\sigma \quad \text{equation (3)}$$

where, $I(X)$ is the Contrastive IDM value for video X, n is the number of video frames in video X, i and j are frame indexes in video X, σ is a window size for separating temporally far away video frames ($y_{ij}=1$ or negative pairs) and temporally close video frames ($y_{ij}=0$ or positive pairs) and λ is a margin parameter. $D_X \in R^{n \times n}$ is the self-distance matrix of fθ(X) and is defined as:

$$D_{X(i,j)}=\|f\theta(x_i)-f\theta(x_j)\|^2 \quad \text{equation (4)}$$

The contrastive-IDM encourages the temporally close video frames (positive pairs) to be mapped to nearby points in the embedding space, while encouraging the temporally far away video frames (negative pairs) to be mapped too far away points in the embedding space.

The temporal alignment loss value determination subsystem 218 is configured for determining temporal alignment loss between the first video data 114 and the second video data 116 using soft-minimum cost path in the distance matrix. In determining the temporal alignment loss between the first video data 114 and the second video data 116 using the soft-minimum cost path in the self-distance matrix and the alignment matrix the temporal alignment loss value determination subsystem 218 is configured for determining the soft-minimum cost path in the distance matrix corresponding to the first video data 114 and the second video data 116. The temporal alignment loss value determination subsystem 218 is configured for determining a smoothing parameter for the determined soft minimum cost path in the distance matrix. Further, the temporal alignment loss value determination subsystem 218 is configured for determining the temporal alignment loss between the first video data 114 and the second video data 116 based on the determined soft-minimum cost path in the distance matrix and the determined smoothing parameter.

In an exemplary embodiment, a classical Dynamic Time Warping (DTW) objective is used as temporal video alignment loss. Specifically, a continuous relaxation version of DTW, namely Soft-DTW, is adopted. In particular, Soft-DTW replaces the discrete min operator in DTW by the smoothed version minγ, written as:

$$\min{}^\gamma\{a1,a2,\ldots,an\}=-\gamma \log \Sigma_{i=1,\ldots,n}e^{-ai/\gamma} \quad \text{equation (5)}$$

where γ>0 is a smoothing parameter. The Soft-DTW returns the alignment cost between the first video data 114 and the second video data 116 by finding the soft-minimum cost path in the distance matrix D, which can be written as:

$$dtw^\gamma(X,Y)=\min{}^\gamma{}_{A\in An,m}<A,D>, \quad \text{equation (6)}$$

where n and m are the numbers of video frames in videos X and Y respectively, i and j are frame indexes in videos X and Y respectively, $A_{n,m} \subset \{0,1\}^{n \times m}$ is the set of all possible (binary) alignment matrices, which correspond to paths from the top-left corner of D to the bottom-right corner of D using only $\{\rightarrow, \downarrow, \searrow\}$ moves. $A \in A_{n,m}$ is a typical alignment matrix, with $A(i,j)=1$ if $x_i$ in X is aligned with $y_j$ in Y. $D \in R^{n \times m}$ is the distance matrix between fθ(X) and fθ(Y) with each entry written as:

$$D(i,j)=\|f\theta(x_i)-f\theta(y_j)\|^2 \quad \text{equation (7)}$$

Although above a Soft-DTW is used as a temporal video alignment loss, in general, any temporal video alignment objectives or any combinations of temporal video alignment objectives, may be used as temporal video alignment loss.

In an embodiment, a final video alignment loss value is computed which is a combination of the Soft-DTW alignment loss in equation (6) and the Contrastive-IDM regularization in equation (1):

$$L(X,Y)=dtw^\gamma(X,Y)+\alpha(I(X)+I(Y)) \quad \text{equation (8)}$$

Here, α is the weight for the regularization. The final loss encourages the first embedding video data and the second embedding video data to have minimum alignment costs while encouraging discrepancies among embedding frames.

The video frame correlator subsystem 220 is configured for determining correlated video frames between the first video data 114 and the second video data 116 based on the determined temporal alignment loss and the determined contrastive IDM temporal regularization value. The correlated video frames between the first video data 114 and the second video data 116 are aligned in time. An embedding function is determined by optimizing the temporal alignment loss and the contrastive IDM temporal regularization value. The video frame correlator subsystem 220 is configured for mapping each video frame in the first video data 114 with the corresponding video frame in the second video data 116 based on the embedding function determined by optimizing temporal alignment loss and contrastive IDM temporal regularization loss. Further, the video frame correlator subsystem 220 is configured for generating an embedding space comprising the mapped video frame in the first video data 114 with corresponding video frame in the second video data 116, wherein the embedding space is a coordinate system (usually high dimensional) where projection of the first video data 114 and second video data 116 are close to each other (in the Euclidean distance sense) if action represented in those first video data 114 and the second video data 116 is similar, while the projection are far away from each other if the action represented in those first video data 114 and the second video data 116 is dissimilar. Further, the video frame correlator subsystem 220 is configured for determining the correlated video frames between the first video data 114 and the second video data 116 by finding distance between respective projections of the first video data 114 and the second video data 116 in the embedding space.

The rendering subsystem 222 is configured for rendering the determined correlated video frames between the first video data 114 and the second video data 116 on the user interface 108 of the user device 106.

The plurality of subsystems 112 further comprises an annotation subsystem (not shown) configured for determining annotations of video frames in the first video data 114. Further, the annotation subsystem is configured for transferring the determined annotation of video frames in the first video data 114 to corresponding correlated video frame in the second video data 116. The first video data 114 is a labelled video data and the second video data 116 is unlabelled video data. The labels/annotations can be the action phase/step shown in each video frame. For example, in video frames indexed 216-238, the action phase/step of picking up screwdriver in a manual assembly task is happening, or from video frames indexed 531-589, the action phase/step of checking the lateral view of the liver in Focused Assessment with Sonography for Trauma (FAST) is occurring.

The plurality of subsystems 112 further comprises an anomaly detection subsystem (not shown) configured for detecting anomalies in the second video data 116 using the first (normal) video data 114 by comparing distances between the correlated video frames with a predefined threshold value. For example, the distance can be computed as the Euclidean distance between the correlated embedding video frames. The predefined threshold value is defined by the computing system 102. The anomalies can be an action phase/step that is different from the one observed in the correlated video frame of the first (normal) video data 114. For example, the video frame of the second video data 116 is showing a random action such as the worker leaves his workstation, whereas the correlated video frame of the first (normal) video data 114 shows the action phase/step of picking up screwdriver. The plurality of subsystems 112 further comprises an action phase label prediction subsystem (not shown) configured for training a machine learning classifier model for one of the first embedding video data or the second embedding video data. The machine learning classifier model classifies the generated embedding video data into different action phases/steps, e.g., picking up screwdriver, installing a CPU fan, and connect CPU to motherboard. The machine learning classifier model may be, for example a supervised learning classifier model. Further, the action phase label prediction subsystem (not shown) is configured for identifying an action phase label in the one of the first embedding video data or the second embedding video data based on the trained machine learning classifier model. The action phase label prediction subsystem (not shown) is further configured for predicting the action phase label for the one of the first embedding video data or the second embedding video data using the machine learning classifier model.

The plurality of subsystems 112 further comprises an action phase progression prediction subsystem (not shown) configured for predicting action phase progression values for the one of the first embedding video data and the second embedding video data using a machine learning regression model. The machine learning regression model may be for example a linear regression model. The action phase progression value is a scalar number in [0,1] indicating how well an action is progressing over time. 0 means the action is just started, while 1 means the action is completed.

The plurality of subsystems 112 further comprises a video frame retrieval subsystem (not shown) configured for determining whether the one or more video frames in the second video data 116 matches with at least one video frame of the first video data 114 by using one or more retrieval techniques. The video frame retrieval subsystem is further configured for retrieving the one or more video frames in the second video data 116 that matches with the at least one video frame of the first video data 114 based on the determination.

The storage unit 206 stores the information relating to the first video data 114 and the second video data 116 and other related information. The storage unit 206 is, for example, a structured query language (SQL) data store. The storage unit 206 is configured as a cloud-based database implemented in the computing environment 100, where software applications are delivered as a service over a cloud platform. The storage unit 206, according to another embodiment of the present disclosure, is a location on a file system directly accessible by the plurality of subsystems 112. The storage unit 206 is configured to store the first embedding video data, the second embedding video data, the self-distance matrix, the margin parameter, the window size, the temporal alignment loss, the contrastive IDM temporal regularization value, and the like.

Figure 3:
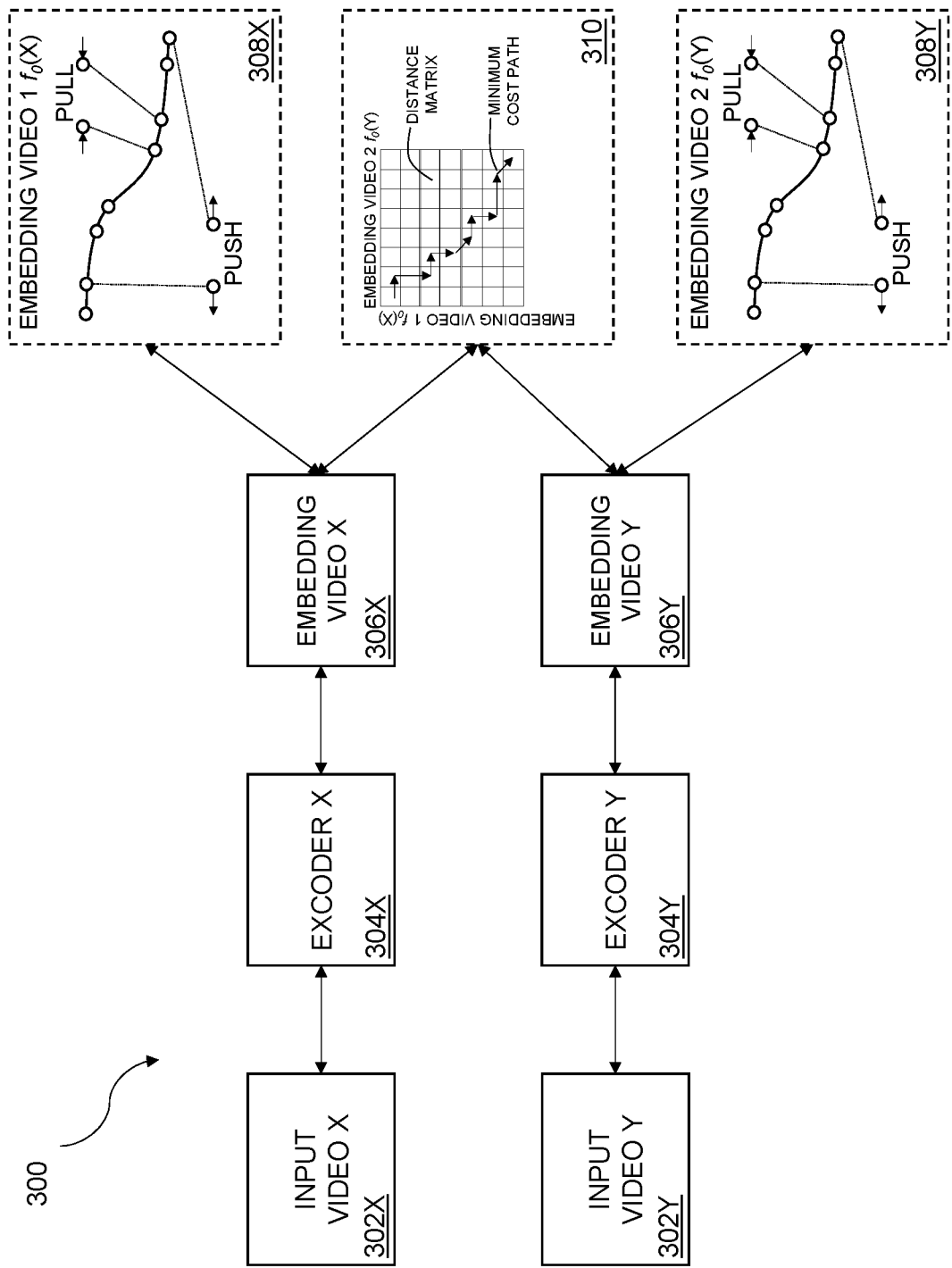
FIG. 3 is a block diagram illustrating various components of the computing system capable of determining a contrastive inverse different moment (IDM) temporal regularization value and temporal alignment loss between a first video data and a second video data in accordance with an embodiment of the present disclosure.

FIG. 3 is a block diagram 300 illustrating various components of the computing system 102 capable of determining the contrastive IDM temporal regularization value and temporal alignment loss between the first video data 114 and the second video data 116 in accordance with an embodiment of the present disclosure. According to FIG. 3, two input videos X (302X) and Y (302Y) are used. These two input videos X and Y are analogous to the first video data 114 and the second video data 116. Such input videos X and Y are retrieved from the one or more external data sources 110. Each of these input videos X and Y captures a scene. For example, the scene may be a child assembling a toy. The input videos X and Y are fed to the encoders X (304X) and Y (304Y), which produce the embedding videos X (306X) and Y (306Y) respectively. Let us denote the embedding function as fθ, namely a neural network with parameters theta (θ). The input video $X=\{x_1, x_2, \ldots, x_n\}$ and the input video $Y=\{y_1, y_2, \ldots, y_m\}$, where n and m are the numbers of video frames in X and Y respectively. For the video frame $x_i$ in X and $y_j$ in Y, the embedding video frames of $x_i$ and $y_j$ are written as $f\theta(x_i)$ and $f\theta(yj)$ respectively. In addition, the embedding video X (306X) is denoted as $f\theta(X)=\{f\theta(x1), f\theta(x2), \ldots, f\theta(xn)\}$ and the embedding video Y (306Y) is denoted as $f\theta(Y)=\{f\theta(y1), f\theta(y2), \ldots, f\theta(ym)\}$. The embedding videos X (306X) and Y (306Y) lie in the embedding space. Modules 308X and 308Y compute the contrastive IDM temporal regularization value for the embedding videos X (306X) and Y (306Y) respectively, as in equation (1). Module 310 computes the the temporal alignment loss between the embedding videos X (306X) and Y (306Y), as in equation (6).

Figure 4:
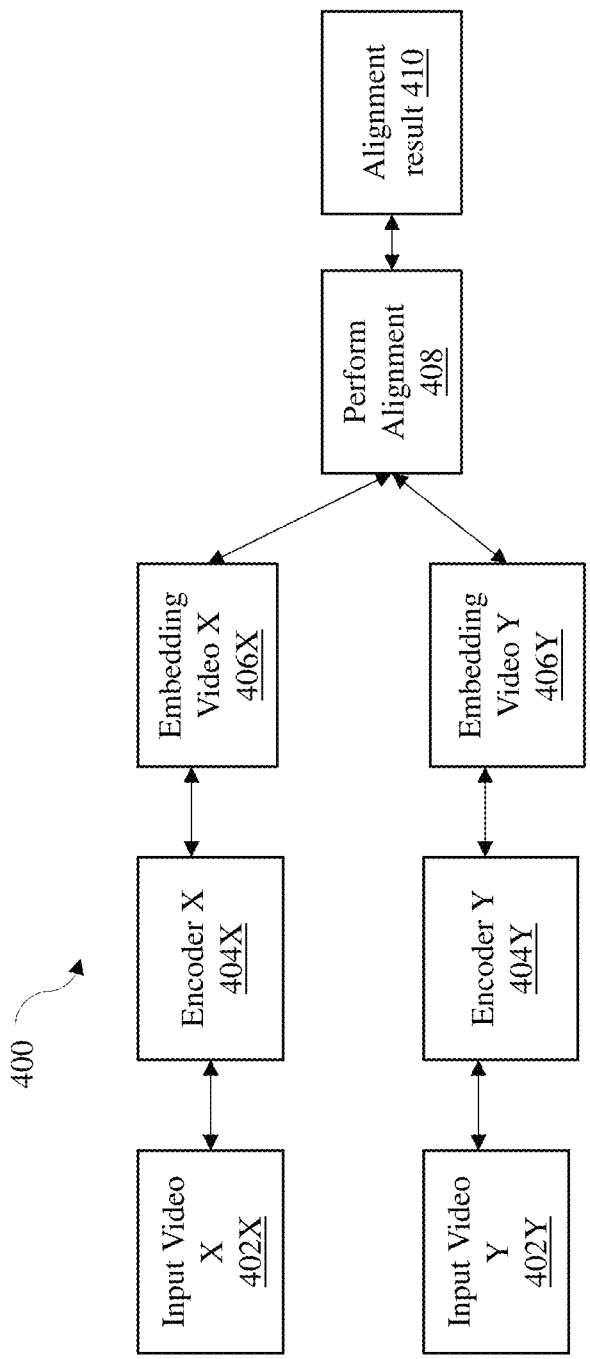
FIG. 4 is a block diagram illustrating various components of the computing system capable of determining correlated video frames between the first video data and the second video data in accordance with an embodiment of the present disclosure.

FIG. 4 is a block diagram 400 illustrating various components of the computing system 102 capable of determining correlated video frames between the first video data 114 and the second video data 116 in accordance with an embodiment of the present disclosure. According to FIG. 4, two input videos 402X and 402Y are used. The input videos 402X and 402Y are then fed to the encoders 404X and 404Y, which output the embedding videos 406X and 406Y. The embedding videos 406X and 406Y are analogous to the first embedding video $f\theta(X)$ and the second embedding video $f\theta(Y)$. At step 408, alignment is performed between the first embedding video $f\theta(X)$ and the second embedding video $f\theta(Y)$ using nearest neighbour search or any temporal video alignment objectives, such as for example, the DTW. This alignment results in the alignment result 410, which is a frame correspondence between the input videos 402X and 402Y. The frame correspondence are pairs of (i,j) where i and j are frame indexes in videos X and Y respectively. Corresponding frames in videos X and Y show the same action phase/step.

Figure 5:
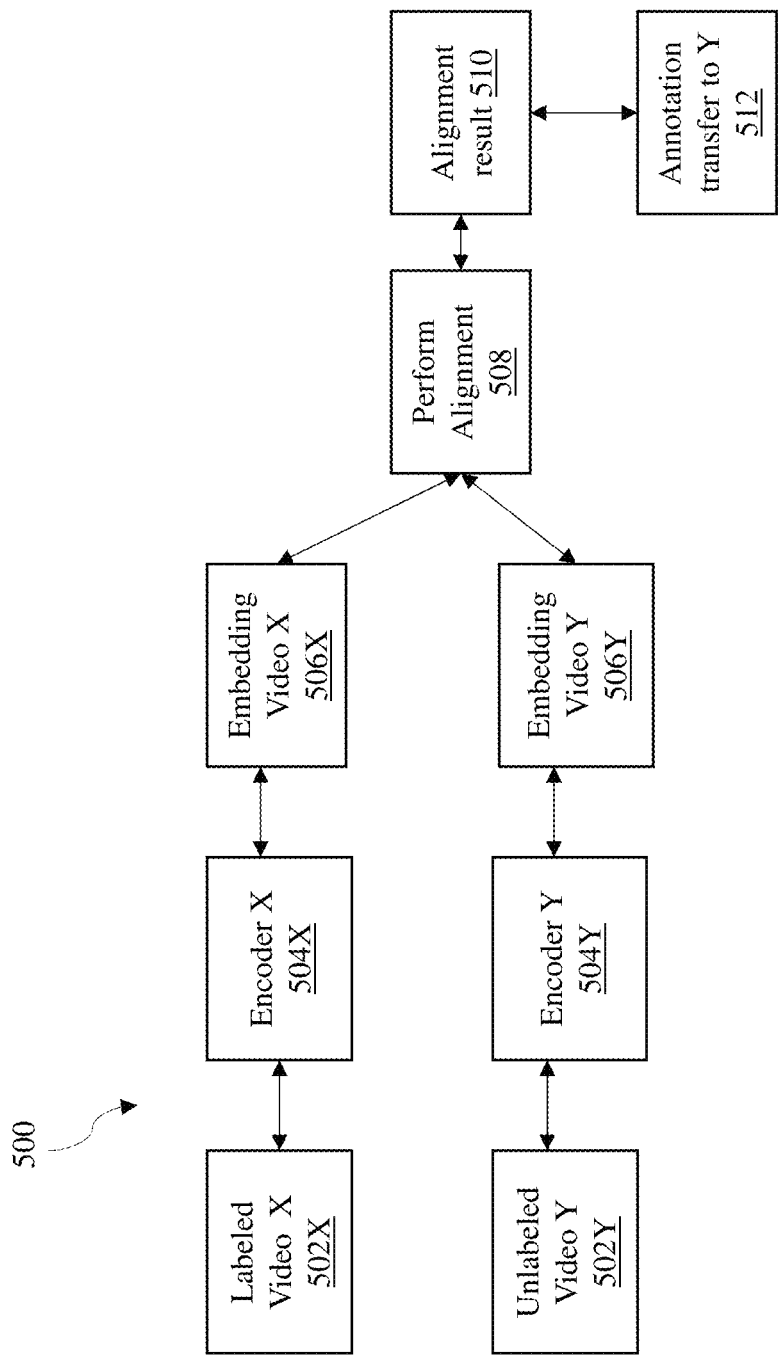
FIG. 5 is a block diagram illustrating various components of the computing system capable of transferring the determined annotation of video frames in the first video data to corresponding correlated video frame in the second video data in accordance with an embodiment of the present disclosure.

FIG. 5 is a block diagram 500 illustrating various components of the computing system 102 capable of transferring the determined annotation of video frames in the first video data 114 to corresponding correlated video frame in the second video data 116 in accordance with an embodiment of the present disclosure. According to FIG. 5, a labelled video 502X and an unlabelled video 502Y are taken as input videos. These input videos are then fed to the encoders 504X and 504Y respectively to produce encoded videos 506X and 506Y. At step 508, an alignment is performed on the first embedding video and the second embedding video which results in alignment result 510. This alignment result 510 is used to perform, at step 512, annotation transfer of the labels of 502X video to 502Y video.

Figure 6:
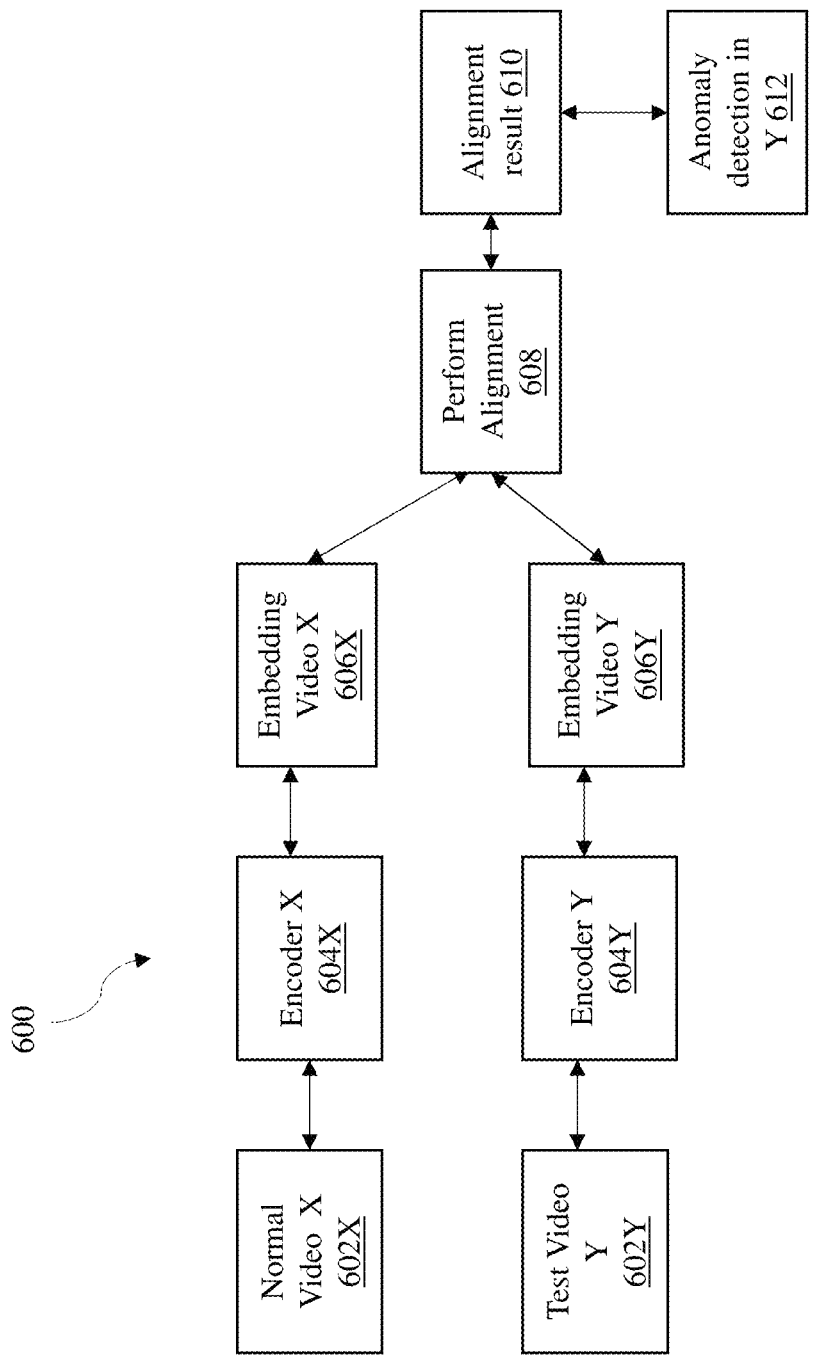
FIG. 6 is a block diagram illustrating various components of the computing system capable of detecting anomalies in the second video data given the first (normal) video data in accordance with an embodiment of the present disclosure.

FIG. 6 is a block diagram 600 illustrating various components of the computing system 102 capable of detecting anomalies in the second video data 116 given the first (normal) video data 114 in accordance with an embodiment of the present disclosure. According to FIG. 6, a normal video 602X and a test video 602Y are taken as input videos. These input videos are then fed to the encoders 604X and 604Y respectively to produce encoded videos 606X and 606Y. At step 608, an alignment is performed on the first embedding video and the second embedding video which results in alignment result 610. This alignment result 610 is used to detect, at step 612, anomalies in the test video 602Y. For example, if the distance between a frame correspondence is smaller than a threshold, the video frame in the test video 602Y is considered as normal, otherwise the video frame in the test video 602Y is considered as abnormal.

Figure 7:
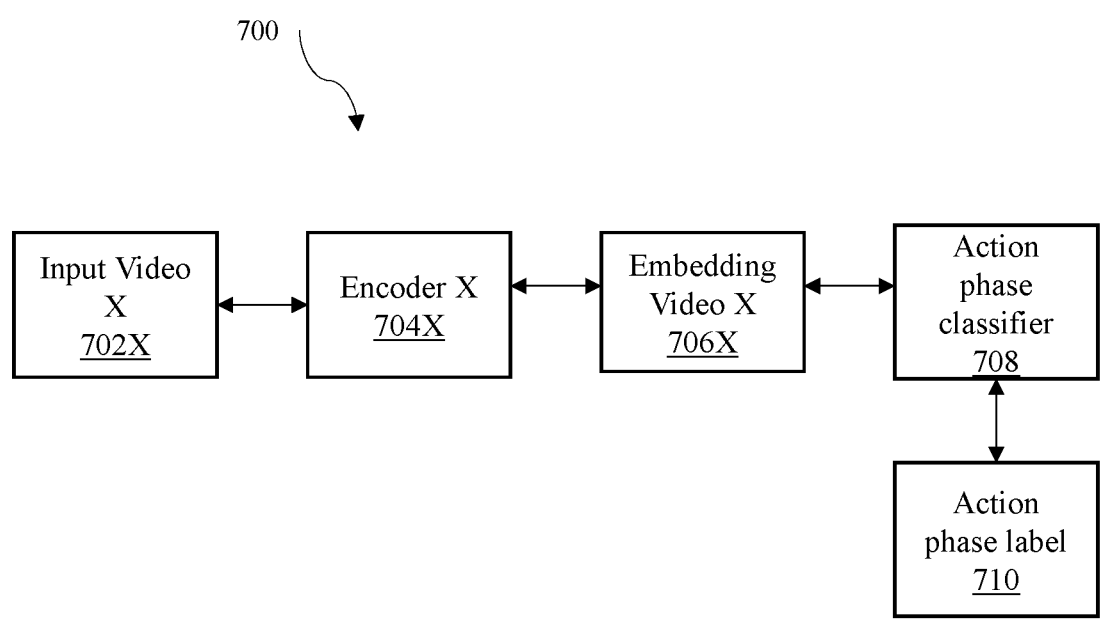
FIG. 7 is a block diagram illustrating various components of the computing system capable of predicting the action phase label associated with the embedding video data in accordance with an embodiment of the present disclosure.

FIG. 7 is a block diagram 700 illustrating various components of the computing system 102 capable of predicting the action phase label associated with the embedding video data 114 in accordance with an embodiment of the present disclosure. According to FIG. 7, an input video 702X is used. The input video 702X is fed to the encoder 704X to produce an encoded video 706X. The embedding video is then fed to an action phase classifier 708 which classifies the embedding video using Support Vector Machine (SVM) classifier (or in general, any machine learning models). This action phase classifier 708 helps in predict the action phase label 710 corresponding to the input video 702X.

Figure 8:
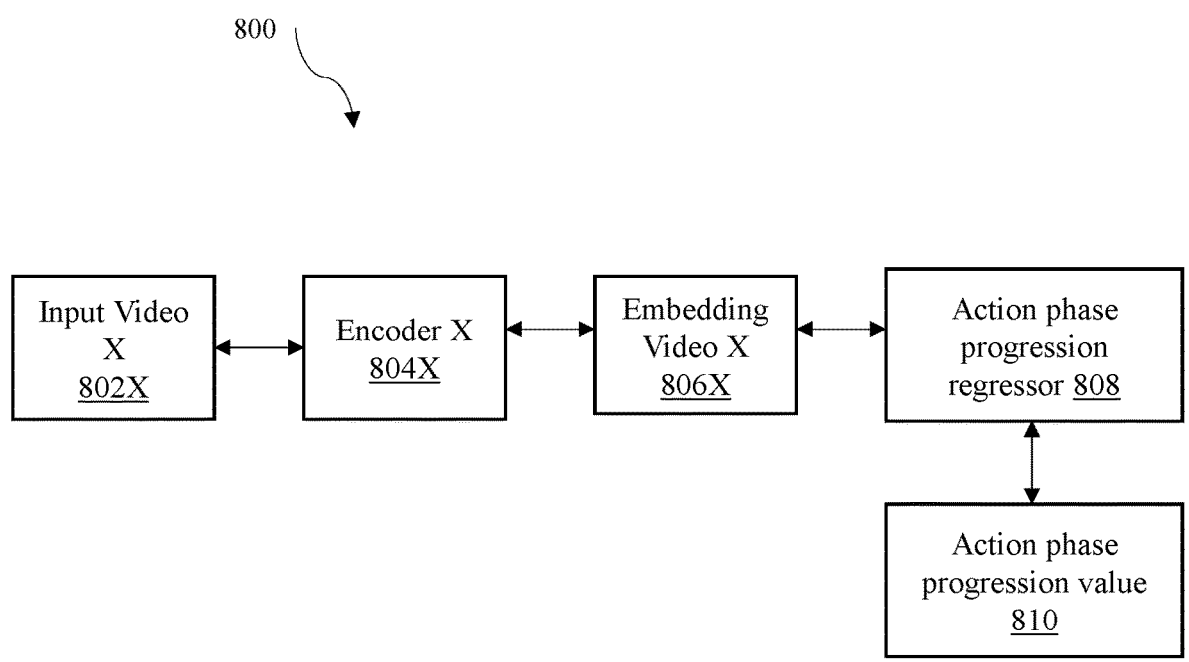
FIG. 8 is a block diagram illustrating various components of the computing system capable of predicting action phase progression values for the embedding video data in accordance with an embodiment of the present disclosure.

FIG. 8 is a block diagram 800 illustrating various components of the computing system 102 capable of predicting action phase progression values for the embedding video data 114 in accordance with an embodiment of the present disclosure. According to FIG. 8, an input video 802X is used. The input video 802X is fed to the encoder 804X to produce an encoded video 806X. The embedding video is then fed to an action progression regressor 808. This action progression regressor 808 helps in determining the action phase progression value 810 corresponding to the input video 802X using a linear regressor (or in general, any machine learning models).

Figure 9:
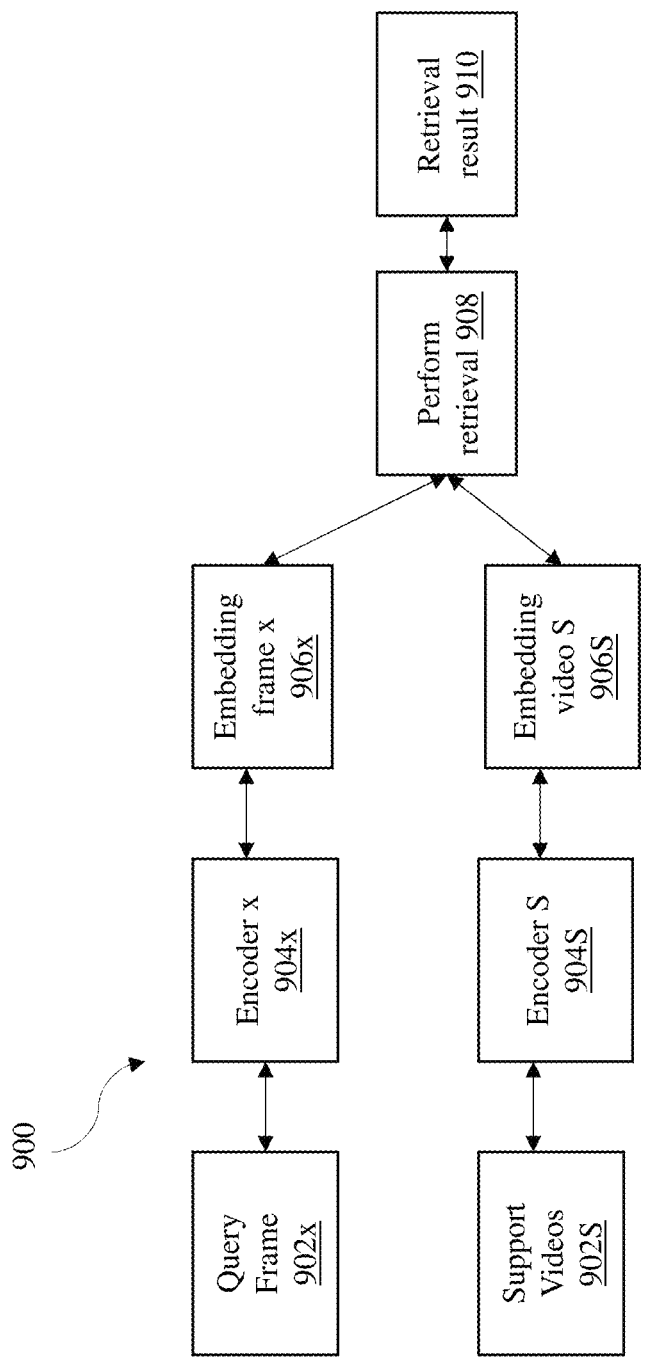
FIG. 9 is a block diagram illustrating various components of the computing system capable of retrieving the one or more video frames in the second video data that matches with the at least one video frame of the first video data in accordance with an embodiment of the present disclosure.

FIG. 9 is a block diagram 900 illustrating various components of the computing system 102 capable of retrieving the one or more video frames in the second video data 116 that matches with the at least one video frame of the first video data 114 in accordance with an embodiment of the present disclosure. According to FIG. 9, a query frame 902$x$ (such as the first video frame 118A) and a support video 902S (such as the second video 116) are taken as input. These input are then fed to the encoders 904$x$ and 904S respectively to produce encoded frame 906$x$ and encoded video 906S. At step 908, those K video frames in the encoded video 906S which are closest to the encoded frame 906$x$ are retrieved. This results in K frames which are the retrieval result 910.

Figure 10:
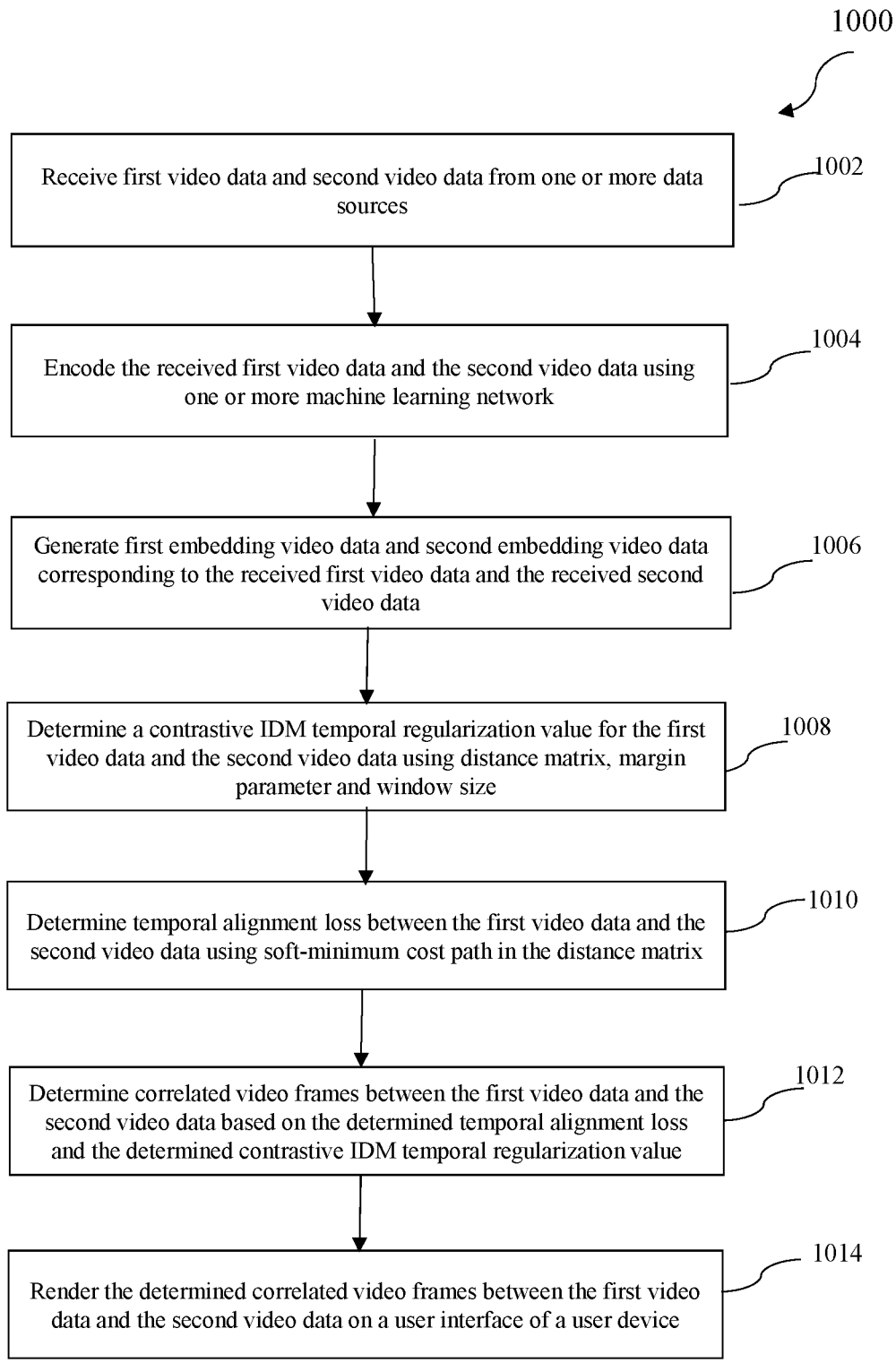
FIG. 10 is a process flow diagram illustrating an exemplary method for correlating video frames in accordance with an embodiment of the present disclosure.

FIG. 10 is a process flow diagram illustrating an exemplary method 1000 for correlating video frames in accordance with an embodiment of the present disclosure. At step 1002, a first video data 114 and second video data 116 are received from one or more data sources 110. Each of the first video data 114 and the second video data 116 comprises at least one of a video frame or a set of video frames. At step 1004, the received first video data 114 and the second video data 116 are encoded using one or more machine learning networks. At step 1006, a first embedding video data and a second embedding video data corresponding to the received first video data 114 and the received second video data 116 are generated. The first embedding video data and the second embedding video data comprises first feature vectors and second feature vectors. At step 1008, a contrastive IDM temporal regularization value for the first video data 114 and the second video data 116 is determined using self-distance matrix, margin parameter and window size. At step 1010, a temporal alignment loss between the first video data 114 and the second video data 116 is determined using soft-minimum cost path in the distance matrix. At step 1012, correlated video frames between the first video data 114 and the second video data 116 is determined based on the determined temporal alignment loss and the determined contrastive IDM temporal regularization value. The correlated video frames between the first video data 114 and the second video data 116 are aligned in time. An embedding function is determined by optimizing the temporal alignment loss and the contrastive IDM temporal regularization value. At step 1014, the determined correlated video frames between the first video data 114 and the second video data 116 is rendered on the user interface 108 of the user device 106.

The method further includes determining annotations of video frames in the first video data 114. The method further includes transferring the determined annotation of video frames in the first video data 114 to corresponding correlated video frame in the second video data 116. The first video data 114 is a labelled video data and the second video data 116 is unlabelled video data.

The method further includes detecting anomalies in the second video data 116 using the first (normal) video data 114 by comparing distance between correlated video frames with a predefined threshold value.

The method further includes training a machine learning classifier model for one of the first embedding video data or the second embedding video data. The method further includes identifying an action phase label in the one of the first embedding video data or the second embedding video data based on the trained machine learning classifier model. Further, the method includes predicting the action phase label for the one of the first embedding video data or the second embedding video data using the machine learning classifier model.

The method further includes predicting action phase progression values for the one of the first embedding video data and the second embedding video data using a machine learning regression model.

The method further includes determining whether the one or more video frames in the second video data 116 matches with at least one video frame of the first video data 114 by using one or more retrieval techniques. The method further includes retrieving the one or more video frames in the second video data 116 that matches with the at least one video frame of the first video data 114 based on the determination.

In encoding the received first video data 114 and the second video data 116 using one or more machine learning networks, the method further includes extracting one or more features associated with each of the first video data 114 and the second video data 116. The method further includes aggregating temporal information associated with each of the one or more extracted features using three-dimensional (3D) convolution layers.

In generating first embedding video data and second embedding video data corresponding to the received first video data 114 and the received second video data 116 the method includes analysing the aggregated temporal information associated with each of the extracted features. The method includes learning an artificial neural network encoder model associated with the extracted one or more features based on the analysis. The artificial neural network encoder model comprises first feature vectors associated with the first video data 114 and second feature vectors associated with second video data 116 The method further includes generating first embedding video data and second embedding video data corresponding to the received first video data 114 and the received second video data 116 based on the learned artificial neural network encoder model.

In determining the contrastive IDM temporal regularization value for the first video data and the second video data using distance matrix, margin parameter and window size, the method includes determining distance matrix for the first video data 114 and the second video data 116 using the first embedding video data and the second embedding video data. The method includes determining margin parameter and window size for each video frame in the first video data 114 and the second video data 116. The window size indicates temporally far away video frames and temporally close video frames. The method includes determining the contrastive IDM temporal regularization value for the first video data 114 and the second video data 116 using the determined—distance matrix, the margin parameter and the window size.

In determining the temporal alignment loss between the first video data 114 and the second video data 116, using the soft-minimum cost path in the self-distance matrix and the alignment matrix the method includes determining soft minimum cost path in the distance matrix. The method further includes determining a smoothing parameter for the determined soft minimum cost path in the distance matrix.

The method includes determining the temporal alignment loss between the first video data 114 and the second video data 116 based on the determined soft-minimum cost path in the distance matrix and the determined smoothing parameter.

In determining correlated video frames between the first video data 114 and the second video data 116 based on the determined temporal alignment loss and the determined contrastive IDM temporal regularization value, the method includes mapping each video frame in the first video data 114 with each video frame in the second video data 116 based on the embedding function determined by optimizing temporal alignment loss and contrastive IDM temporal regularization loss. The correlated video frames between the first video data 114 and the second video data 116 are aligned in time. The method includes generating an embedding space comprising the mapped video frame in the first video data with corresponding video frame in the second video data, wherein the embedding space is a coordinate system (usually high dimensional) where projection of the first video data and second video data are close to each other (in the Euclidean distance sense) if action represented in those first video data and the second video data is similar, while the projection are far away from each other if the action represented in those first video data and the second video data is dissimilar. The method includes determining the correlated video frames between the first video data 114 and the second video data 116 by finding the distance between respective projections of the first video data and the second video data in the embedding space.

Various embodiments of the present system provide a technical solution to the problem of temporal video alignment. This system introduces a novel self-supervised approach for learning video representations by temporally aligning videos as a whole, leveraging both frame-level and video-level cues. Further, the optimal cost for temporally aligning videos in the embedding space (e.g., Dynamic Time Warping) is used as temporal video alignment loss, while a new temporal regularization (i.e., Contrastive Inverse Difference Moment) is disclosed in this disclosure. The two components have complementary benefits, i.e., the latter prevents trivial solutions, whereas the former leads to better performance. Further, the learned features can be employed for temporal video alignment, e.g., by simply matching feature vectors using nearest neighbour search, which enables other applications such as annotation transfer in videos and anomaly detection in videos. Additionally, the learned embeddings can be applied for other temporal understanding tasks, including action phase classification, action phase progression, and fine-grained frame retrieval in videos. The present system further optimizes video representations over the entire training dataset (i.e., multiple videos), benefiting from observed variations in an activity, such as a manufacturing assembly process or a medical procedure among others, by aligning the videos in time. In addition to learning the video representation, a method to find clip correspondences between the videos in the training dataset as well as against novel videos depicting the same activity is disclosed. Further, the present system provides a mechanism to align all video frames jointly, leveraging both frame level and video level cues.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A system for learning self-supervised video representations in a computing environment, the system comprising:
  one or more hardware processors; and
  a memory coupled to the one or more hardware processors, wherein the memory comprises a plurality of subsystems in the form of programmable instructions executable by the one or more hardware processors, wherein the plurality of subsystems comprises:
  a receiver subsystem configured for receiving a first video data and a second video data from one or more data sources, wherein each of the first video data and the second video data comprises at least one of a video frame or a set of video frames;
  an encoder subsystem configured for encoding the received first video data and the second video data using one or more machine learning networks;
  an embedding video generator subsystem configured for generating a first embedding video data and a second embedding video data corresponding to the received first video data and the received second video data, wherein the first embedding video data and the second embedding video data comprises first feature vectors and second feature vectors;

a regularization value determination subsystem configured for determining a contrastive Inverse Different Moment (IDM) temporal regularization value for the first video data and the second video data using a self-distance matrix, a margin parameter and a window size;

a temporal alignment loss value determination subsystem configured for determining a temporal alignment loss between the first video data and the second video data using a soft-minimum cost path in the distance matrix;

a video frame correlator subsystem configured for determining correlated video frames between the first video data and the second video data based on the determined temporal alignment loss and the determined contrastive IDM temporal regularization value, wherein the correlated video frames between the first video data and the second video data are aligned in time and wherein an embedding function is determined by optimizing the temporal alignment loss and the contrastive IDM temporal regularization value; and a rendering subsystem configured for rendering the determined correlated video frames between the first video data and the second video data on a user interface of a user device.

2. The system of claim 1, further comprising an annotation subsystem configured for:
determining annotations of video frame in the first video data; and
transferring the determined annotations of the video frame in the first video data to corresponding correlated video frame in the second video data, wherein the first video data is a labelled video data and the second video data is unlabeled video data.

3. The system of claim 1, further comprising an anomaly detection subsystem configured for:
detecting anomalies in the second video data using the first video data by comparing distance between correlated video frames with a predefined threshold value.

4. The system of claim 1, further comprising an action phase label prediction subsystem configured for:
training a machine learning classifier model for one of the first embedding video data or the second embedding video data;
identifying an action phase label in the one of the first embedding video data or the second embedding video data based on the trained machine learning classifier model; and
predicting the action phase label for the one of the first embedding video data or the second embedding video data using the machine learning classifier model.

5. The system of claim 1, further comprising an action phase progression prediction subsystem configured for:
predicting action phase progression values for the one of the first embedding video data or the second embedding video data using a machine learning regression model.

6. The system of claim 1, further comprising a video frame retrieval subsystem configured for:
determining whether the one or more video frames in the second video data matches with at least one video frame of the first video data by using one or more retrieval techniques; and
retrieving the one or more video frames in the second video data that matches with the at least one video frame of the first video databased on the determination.

7. The system of claim 1, wherein in encoding the received first video data and the second video data using one or more machine learning networks, the encoder subsystem is configured for:
extracting one or more features associated with each of the first video data and the second video data; and
aggregating temporal information associated with each of the one or more extracted features using three-dimensional (3D) convolution layers.

8. The system of claim 1, wherein in generating first embedding video data and second embedding video data corresponding to the received first video data and the received second video data, the embedding video generator subsystem is configured for:
analyzing the aggregated temporal information associated with each of the extracted features;
learning an artificial neural network encoder model associated with the extracted one or more features based on the analysis, wherein the artificial neural network encoder model comprises first feature vectors associated with the first video data and second feature vectors associated with second video data; and
generating first embedding video data and second embedding video data corresponding to the received first video data and the received second video data based on the learned artificial neural network encoder model.

9. The system of claim 1, wherein in determining the contrastive IDM temporal regularization value for the first video data and the second video data using self-distance matrix, margin parameter and window size, the regularization value determination subsystem is configured for:
determining self-distance matrix for the first video data and the second video data using the first embedding video data and the second embedding video data;
determining margin parameter and window size for each video frame in the first video data and the second video data, wherein the window size indicates temporally far away video frames and temporally close video frames; and
determining the contrastive IDM temporal regularization value for the first video data and the second video data using the determined self-distance matrix, the margin parameter and the window size.

10. The system of claim 1, wherein in determining the temporal alignment loss between the first video data and the second video data using the soft-minimum cost path in the distance matrix, the temporal alignment loss value determination subsystem is configured for:
determining soft minimum cost path in the distance matrix;
determining a smoothing parameter for the determined soft minimum cost path in the distance matrix; and
determining the temporal alignment loss between the first video data and the second video data based on the determined soft-minimum cost path in the distance matrix and the determined smoothing parameter.

11. The system of claim 1, wherein in determining correlated video frames between the first video data and the second video data based on the determined temporal alignment loss and the contrastive IDM temporal regularization value, the video correlator subsystem is configured for:
mapping each video frame in the first video data with each video frame in the second video data based on the embedding function determined by optimizing temporal alignment loss and contrastive IDM temporal regularization loss;

generating an embedding space comprising the mapped video frame in the first video data with corresponding video frame in the second video data, wherein the embedding space is a coordinate system where projection of the first video data and second video data are close to each other if action represented in those first video data and the second video data is similar, while the projection are far away from each other if the action represented in those first video data and the second video data is dissimilar; and determining the correlated video frames between the first video data and the second video data by finding distance between respective projections of the first video data and the second video data in the embedding space.

12. A method for learning self-supervised video representations in a computing environment, the method comprising:

receiving, by a processor, a first video data and a second video data from one or more data sources, wherein each of the first video data and the second video data comprises at least one of a video frame or a set of video frames;

encoding, by the processor, the received first video data and the second video data using one or more machine learning networks;

generating, by the processor, a first embedding video data and a second embedding video data corresponding to the received first video data and the received second video data, wherein the first embedding video data and the second embedding video data comprises first feature vectors and second feature vectors;

determining, by the processor, a contrastive Inverse Different Moment (IDM) temporal regularization value for the first video data and the second video data using a self-distance matrix, a margin parameter and a window size;

determining, by the processor, a temporal alignment loss between the first video data and the second video data using a soft-minimum cost path in the distance matrix;

determining, by the processor, correlated video frames between the first video data and the second video databased on the determined temporal alignment loss and the determined contrastive IDM temporal regularization value, wherein the correlated video frames between the first video data and the second video data are aligned in time, and wherein an embedding function is determined by optimizing the temporal alignment loss and the contrastive IDM temporal regularization value; and rendering, by the processor, the determined correlated video frames between the first video data and the second video data on a user interface of a user device.

13. The method of claim 12, further comprising:
determining annotations of video frame in the first video data; and
transferring the determined annotations of the video frame in the first video data to corresponding correlated video frame in the second video data, wherein the first video data is a labelled video data and the second video data is unlabeled video data.

14. The method of claim 12, further comprising:
detecting anomalies in the second video data using the first video data by comparing distance between correlated video frames with a predefined threshold value.

15. The method of claim 12, further comprising:
training a machine learning classifier model for one of the first embedding video data or the second embedding video data;

identifying an action phase label in the one of the first embedding video data or the second embedding video data based on the trained machine learning classifier model; and
predicting the action phase label for the one of the first embedding video data or the second embedding video data using the machine learning classifier model.

16. The method of claim 12, further comprising:
predicting action phase progression values for the one of the first embedding video data or the second embedding video data using a machine learning regression model.

17. The method of claim 12, further comprising:
determining whether the one or more video frames in the second video data matches with at least one video frame of the first video data by using one or more retrieval techniques; and
retrieving the one or more video frames in the second video data that matches with the at least one video frame of the first video data based on the determination.

18. The method of claim 12, wherein encoding the received first video data and the second video data using one or more machine learning networks comprises:
extracting one or more features associated with each of the first video data and the second video data; and
aggregating temporal information associated with each of the one or more extracted features using three-dimensional (3D) convolution layers.

19. The method of claim 12, wherein generating first embedding video data and second embedding video data corresponding to the received first video data and the received second video data comprises:
analyzing the aggregated temporal information associated with each of the extracted features;
learning an artificial neural network encoder model associated with the extracted one or more features based on the analysis, wherein the artificial neural network encoder model comprises first feature vectors associated with the first video data and second feature vectors associated with second video data; and
generating first embedding video data and second embedding video data corresponding to the received first video data and the received second video data based on the learned artificial neural network encoder model.

20. The method of claim 12, wherein determining the contrastive IDM temporal regularization value for the first video data and the second video data using self-distance matrix, margin parameter and window size comprises:
determining self-distance matrix for the first video data and the second video data using the first embedding video data and the second embedding video data;
determining margin parameter and window size for each video frame in the first video data and the second video data, wherein the window size indicates temporally far away video frames and temporally close video frames; and
determining the contrastive IDM temporal regularization value for the first video data and the second video data using the determined self-distance matrix, the margin parameter and the window size.

21. The method of claim 12, wherein determining the temporal alignment loss between the first video data and the second video data using the soft-minimum cost path in the distance matrix comprises:
determining soft minimum cost path in the distance matrix;
determining a smoothing parameter for the determined soft minimum cost path in the distance matrix; and determining the temporal alignment loss between the first video data and the second video data based on the determined soft-minimum cost path in the distance matrix and the determined smoothing parameter.

22. The method of claim 12, wherein determining correlated video frames between the first video data and the second video data based on the determined temporal alignment loss and the contrastive IDM temporal regularization value comprises:

mapping each video frame in the first video data with each video frame in the second video data based on the embedding function determined by optimizing temporal alignment loss and contrastive IDM temporal regularization loss;

generating an embedding space comprising the mapped video frame in the first video data with corresponding video frame in the second video data, wherein the embedding space is a coordinate system where projection of the first video data and second video data are close to each other action represented in those first video data and the second video data is similar, while the projection are far away from each other if the action represented in those first video data and the second video data is dissimilar; and determining the correlated video frames between the first video data and the second video data by finding distance between respective projections of the first video data and the second video data in the embedding space.

\* \* \* \* \*